US007466999B2

(12) United States Patent
Chen et al.

(10) Patent No.: US 7,466,999 B2
(45) Date of Patent: Dec. 16, 2008

(54) WIRELESS COMMUNICATION DEVICE CAPABLE OF SWITCHING TO AN EXTERNAL ANTENNA MODULE OR AN INTERNAL ANTENNA MODULE

(75) Inventors: Yin-Yu Chen, Taipei Hsien (TW); Wen-Chieh Wu, Taipei Hsien (TW)

(73) Assignee: Wistron Corporation, Hsi-Chih, Taipei Hsien (TW)

( * ) Notice: Subject to any disclaimer, the term of this patent is extended or adjusted under 35 U.S.C. 154(b) by 468 days.

(21) Appl. No.: 11/382,929

(22) Filed: May 11, 2006

(65) Prior Publication Data
US 2007/0213017 A1 Sep. 13, 2007

(30) Foreign Application Priority Data
Mar. 9, 2006 (TW) ............... 95108005 A

(51) Int. Cl.
*H04M 1/00* (2006.01)
*H04B 1/38* (2006.01)

(52) U.S. Cl. ............... 455/575.7; 455/550.1; 455/90.3

(58) Field of Classification Search ........... 455/82, 455/562.1, 575.7, 121, 129, 193.1, 550.1, 455/90.3, 19, 25, 101
See application file for complete search history.

(56) References Cited

U.S. PATENT DOCUMENTS

| | | | |
|---|---|---|---|
| 4,117,495 A * | 9/1978 | Hochstein | ........... 343/877 |
| 5,722,089 A | 2/1998 | Murakami | |
| 6,694,150 B1 * | 2/2004 | Standke et al. | ........... 455/552.1 |
| 6,756,859 B2 * | 6/2004 | Kodim | ........... 333/101 |
| 7,155,178 B2 | 12/2006 | Chang et al. | |
| 7,194,284 B2 * | 3/2007 | Rousu | ........... 455/553.1 |
| 7,251,499 B2 * | 7/2007 | Ella et al. | ........... 455/552.1 |
| 2002/0060615 A1 * | 5/2002 | Kodim | ........... 333/101 |
| 2002/0098810 A1 | 7/2002 | Murakami | |
| 2003/0114188 A1 * | 6/2003 | Rousu | ........... 455/553 |
| 2004/0018815 A1 | 1/2004 | Lin et al. | |
| 2006/0073829 A1 * | 4/2006 | Cho et al. | ........... 455/439 |
| 2007/0018895 A1 * | 1/2007 | Bolin | ........... 343/702 |
| 2007/0199026 A1 * | 8/2007 | Kim | ........... 725/63 |
| 2008/0233890 A1 * | 9/2008 | Baker | ........... 455/73 |

FOREIGN PATENT DOCUMENTS

| | | |
|---|---|---|
| TW | 589810 | 6/2004 |
| TW | M260886 | 4/2005 |
| TW | 1248262 | 1/2006 |
| WO | 95/13668 | 5/1995 |

* cited by examiner

*Primary Examiner*—Sonny Trinh
(74) *Attorney, Agent, or Firm*—Winston Hsu

(57) ABSTRACT

A wireless communication device includes an internal antenna module, a DC power source, a signal processing module, a first low noise amplifier coupled to the internal antenna module including a signal input end, a power input end, and a signal output end. The wireless communication device further includes a switch including a first terminal for coupling to an external antenna module, a second terminal, and a third terminal. The wireless communication device further includes a first equivalent inductor coupled to the DC power source and the second terminal, a second equivalent inductor coupled to the input end of the first low noise amplifier and the third terminal, a first capacitor coupled to the signal output end of the first low noise amplifier and the third terminal, and a second capacitor coupled to the signal processing module and the second terminal.

10 Claims, 4 Drawing Sheets

WIRELESS COMMUNICATION DEVICE CAPABLE OF SWITCHING TO AN EXTERNAL ANTENNA MODULE OR AN INTERNAL ANTENNA MODULE

BACKGROUND OF THE INVENTION

1. Field of the Invention

The present invention relates to a wireless communication device, and more particularly, to a wireless communication device capable of switching to an external antenna module or an internal antenna module.

2. Description of the Prior Art

Currently in the development of system on chip/system in packet (SoC/SiP) technology, there are global positioning system (GPS) chipsets that integrate low noise amplifiers (LNAs). This method simplifies module wiring as the method replaces the conventional way of installing the LNA within an internal antenna module. Please refer to FIG. 1. FIG. 1 illustrates a circuit diagram of a conventional wireless communication device 10. The wireless communication device 10 can be a GPS wireless communication device. The wireless communication device 10 includes a housing 12, an internal antenna module 14, a first surface acoustic wave (SAW) filter 16, and a GPS system in packet (SiP) 18, an electric current detector 24, a switch 26, and a second surface acoustic wave filter 28. The internal antenna module 14 is installed within the housing 12 and transmits wireless communication signals. The first surface acoustic wave (SAW) filter 16 is installed within the housing and coupled to the internal antenna module 14 and filters the wireless communication signals, such as radio signals, received by the internal antenna module 14. The GPS system in packet (SiP) 18 is installed within the housing 12 and receives the wireless communication signals transmitted from the internal antenna module 14 and processes the wireless communication signals. Furthermore, the GPS SiP 18 includes a first low noise amplifier 20 and a signal processing module 22. The first low noise amplifier 20 has a signal input end 20a that is coupled to the first surface acoustic wave filter 16 for amplifying the wireless communication signals transmitted from the first surface acoustic wave filter 16. Power required by the first noise amplifier 20 is provided by a direct current (D/C) power source Vcc_LNA through a power input end 20b. The signal processing module 22 processes the wireless communication signal, where the signal processing module 22 can include a mixer for mixing the wireless communication signal, for example mixing baseband signals with local oscillating signals to generate radio signals, or mixing radio signals with local oscillating signals to generate baseband signals. The wireless communication device 10 further includes the electric current detector 24, the switch 26 coupled to a signal output end 20c of the first low noise amplifier 20 and the electric current detector 24, and the second surface acoustic wave filter 28 installed within the housing 12 and coupled to the switch 26 and the signal processing module 22 for filtering the wireless communication signals transmitted from the switch 26 and transmitting the filtered signals to the signal processing module 22. The wireless communication device 10 can be connected to an external antenna module 30. The external antenna module 30 includes an antenna unit 32, a second low noise amplifier 34, and a capacitance C. The antenna unit 32 transmits wireless communication signals. The second low noise amplifier 34 amplifies the wireless communication signals received from the antenna unit 32. Finally, the capacitance C is installed between and coupled to the second low noise amplifier 34 and the switch 26 for blocking direct current. When the wireless communication device 10 is connected to the external antenna module 30, the electric current detector 24 can output corresponding signals to the switch 26 according to electric current change through a resistance R, because the second low noise amplifier 34 requires an inductance L to receive a direct current provided by Vcc. In other words, connecting the wireless communication device 10 to the external antenna module 30 may result in the electric current detector 24 detecting a different electric current value, and the switch 26 can determine to output the wireless communication signals transmitted from either the first low noise amplifier 20 or the second low noise amplifier 34 to the second surface acoustic wave filter 28 according to the signals transmitted from the electric current detector 24. In this way, the wireless communication device 10 can switch to the internal antenna module 14 or the external antenna module 30.

However, the complex wiring architecture of the wireless communication device 10 results in two undesired effects. First, said complex wiring causes noise and reduced efficiency on the weak GPS signal on the data transmission route. Second, the wireless communication device 10 also requires a combination of the electric current detector 24 and the switch 26 to detect whether the wireless communication device 10 is being connected to the external antenna module 30. Therefore, this creates an increase in the circuit board surface area and an increase in technical difficulty. Both of these factors led to an increase in the cost; furthermore, under the situation where the wireless communication device 10 utilizes the external antenna module 30, the first low noise amplifier 20 within the GPS SiP 18 continues to receive power from the Vcc_LNA. This causes additional power consumption.

SUMMARY OF THE INVENTION

The claimed invention discloses a wireless communication device capable of switching to an external antenna module or an internal antenna module. The wireless communication device comprises a housing, an internal antenna module, a direct current (D/C) power source, a signal processing module, a first low noise amplifier, a switch, a first equivalent inductance, a second equivalent inductance, a first capacitance, and a second capacitance. The internal antenna module is installed within the housing and transmits the wireless communication signals. The direct current (D/C) power source provides power. The signal processing module is installed within the housing and processes the wireless communication signals. The first low noise amplifier is coupled to the internal antenna module and amplifies the wireless communication signal received by the internal antenna module. The first low noise amplifier further comprises a signal input end, a power input end, and a signal output end. The signal input end is coupled to the internal antenna module and receives the wireless communication signals transmitted from the internal antenna module. The power input end receives direct current provided from the D/C power source. The signal output end outputs the amplified wireless communication signals. The switch comprises: a first terminal, a second terminal, and a third terminal. The first terminal is coupled to a second low noise amplifier of an external antenna module. The second terminal is coupled to the signal processing module, the D/C power source, and the first terminal. The third terminal is coupled to the signal output end of the first low noise amplifier, the power input end, and the second terminal. The first equivalent inductance is coupled to the D/C power source and the second terminal and blocks wireless communication signals. The second equivalent inductance is coupled to the power input end of the first low noise amplifier and the third terminal and blocks wireless communication signals. The first capacitance is coupled to the signal output end of the first low noise amplifier and the third terminal and blocks direct current. Finally, the second capacitance is coupled to the signal processing module and the second terminal and blocks direct current.

The claimed invention further discloses a wireless communication device capable of switching an external antenna module or an internal antenna module. The wireless communication device comprises: a housing; an internal antenna module, a direct current (D/C) power source, a signal processing module, a first low noise amplifier, an external antenna module, a switch, a first equivalent inductance, a second equivalent inductance, a first capacitance, and a second capacitance. The internal antenna module is installed within the housing and transmits wireless communication signals. The direct current (D/C) power source provides power. The signal processing module is installed within the housing and processes the wireless communication signals. The first low noise amplifier is coupled to the internal antenna module and amplifies the wireless communication signal received by the internal antenna module. The first low noise amplifier further comprises a signal input end, a power input end, and a signal output end. The signal input end is coupled to the internal antenna module and receives the wireless communication signals transmitted from the internal antenna module. The power input end receives direct current provided from the D/C power source. Finally, the signal output end outputs the amplified wireless communication signals. The external antenna module comprises an antenna unit and a second low noise amplifier. The antenna unit transmits wireless communication signals. The second low noise amplifier amplifies the wireless communication signals received by the antenna unit. The switch comprises: a first terminal, a second terminal, and a third terminal. The first terminal is coupled to the second low noise amplifier. The second terminal is coupled to the signal processing module, the D/C power source, and the first terminal. The third terminal is coupled to the signal output end of the first low noise amplifier, the power input end, and the second terminal. The first equivalent inductance is coupled to the D/C power source and the second terminal and blocks wireless communication signals. The second equivalent inductance is coupled to the power input end of the first low noise amplifier and the third terminal and blocks wireless communication signals. The first capacitance is coupled to the signal output end of the first low noise amplifier and the third terminal and blocks direct current. Finally, the second capacitance is coupled to the signal processing module and the second terminal and blocks direct current.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
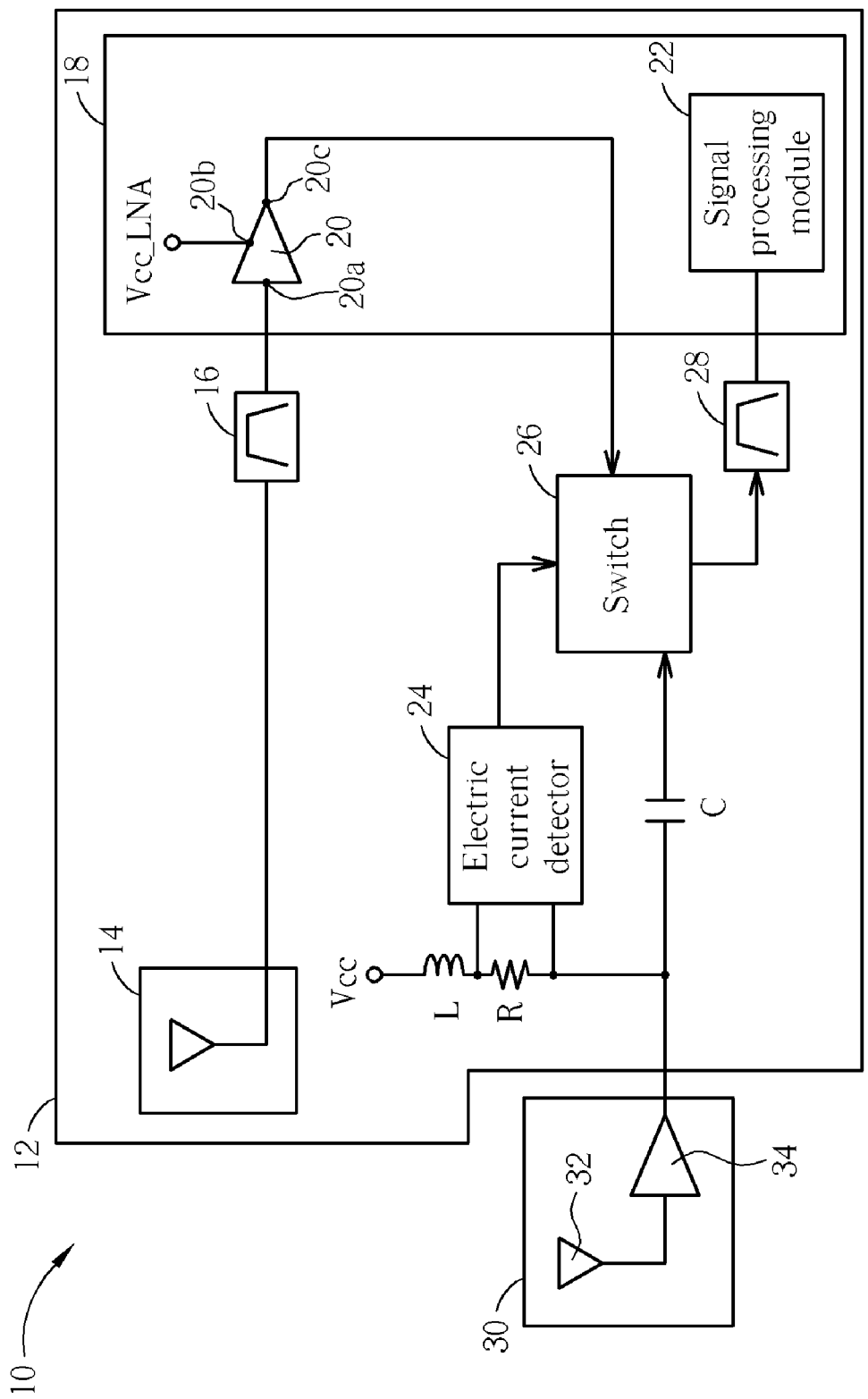
FIG. 1 illustrates a circuit diagram of a conventional wireless communication device.
Figure 2:
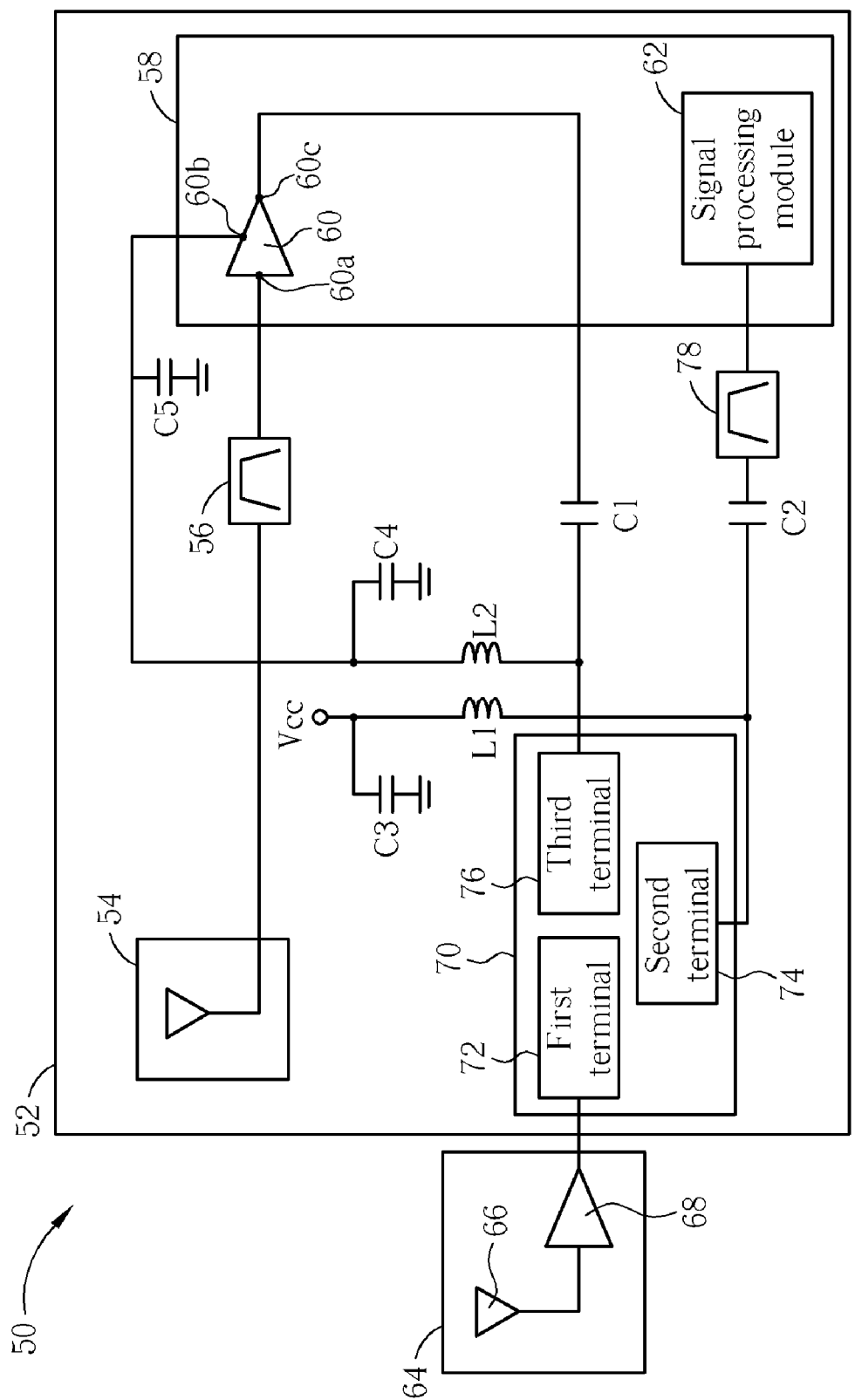
FIG. 2 illustrates a circuit diagram of a wireless communication device according to the present invention.

Please refer to FIG. 2. FIG. 2 illustrates a circuit diagram of a wireless communication device 50 according to the present invention. The wireless communication device 50 can be a global positioning system wireless communication device, the wireless communication device 50 includes a housing 52, an internal antenna module 54 installed within the housing 52 for transmitting wireless communication signals, a first surface acoustic wave (SAW) filter 56 installed within the housing and coupled to the internal antenna module 54 for filtering the wireless communication signals (such as radio signals) received by the internal antenna module 54, and a GPS system in packet (SiP) 58 installed within the housing 52 for receiving the wireless communication signals transmitted from the internal antenna module 54 and processing the wireless communication signals. Please note that if the wireless communication device 50 only transmits GPS signals internally, then there is no need for the filtering process, and the first SAW filter 56 can be excluded. The GPS SiP 58 includes a first low noise amplifier 60, where a signal input end 60a is coupled to the first surface acoustic wave filter 56 for amplifying the wireless communication signals transmitted from the first surface acoustic wave filter 56, and a signal processing module 62 for processing the wireless communication signals, where the signal processing module 62 can include a mixer for mixing the wireless communication signal, for example mixing baseband signals with local oscillating signals to generate radio signals, or mixing radio signals with local oscillating signals to generate baseband signals. The signal processing module 62 can be a GPS signal processing module for processing GPS wireless communication signals. The wireless communication device 50 further includes a direct current (D/C) power source Vcc for providing power, the wireless communication device 50 can be connected to an external antenna module 64, the external antenna module 64 includes an antenna unit 66 for transmitting wireless communication signals, and a second low noise amplifier 68 for amplifying the wireless communication signals received from the antenna unit 66. The wireless communication device 50 further includes a switch 70, the switch includes a first terminal 72 for coupling to the second low noise amplifier 68, a second terminal 74 coupled to the D/C power source Vcc, and a third terminal 76 coupled to a power input end 60b and a signal output end 60c of the first low noise amplifier 60, where the first terminal 72 is coupled to the second terminal 74, and the third terminal 76 is also coupled to the second terminal 74. The wireless communication device 50 further includes a second SAW filter 78 installed within the housing 52 and coupled to the second terminal 74 of the switch 70 and the signal processing module 62 for filtering the wireless communication signals transmitted from the switch 70 and transmitting the filtered signals to the signal processing module 62. Please note that if the wireless communication device 50 only transmits GPS signals internally, then there is no need for the filtering process, and the second SAW filter 78 can be excluded. The wireless communication device 50 further includes a first equivalent inductance L1 coupled to the D/C power source Vcc and the second terminal 74 for blocking wireless communication signals, a second equivalent inductance L2 coupled to a power input end 60b of the first low noise amplifier 60 and the third terminal 76 for blocking wireless communication signals, as the wireless communication signals are signals of high frequency, and the first equivalent inductance L1 and the second equivalent inductance L2 can prevent circuit oscillation effect from occurring when the wireless communication signals couple to direct current. Please note that although the first equivalent inductance L1 and the second equivalent inductance L2 are installed within the housing 52, they can be installed on another circuit board outside the housing 52. The first equivalent inductance L1 and the second equivalent inductance L2 can respectively be an inductance component, or equivalent inductance formed on the circuit board (for example formed in a wired bonding manner). A first capacitance C1 is coupled to the signal output end 60c of the first low noise amplifier 60 and the third terminal 76 for blocking direct current, and a second capacitance C2 is coupled to the second SAW filter 78 and the second terminal 74 for blocking direct current. The wireless communication device 50 further includes a third capacitance C3 coupled to the D/C power source Vcc and the first equivalent inductance L1, a fourth capacitance C4 coupled to the second equivalent L2 and the power input end 60b of the first low noise amplifier 60, and lastly a fifth capacitance C5 coupled to the power input end 60b of the first low noise amplifier 60, the fourth capacitance C4, and the second equivalent inductance L2. The fourth capacitance C4, and the fifth capacitance C5 are utilized for storing electric charge to achieve the function of maintaining electric voltage.

Figure 3:
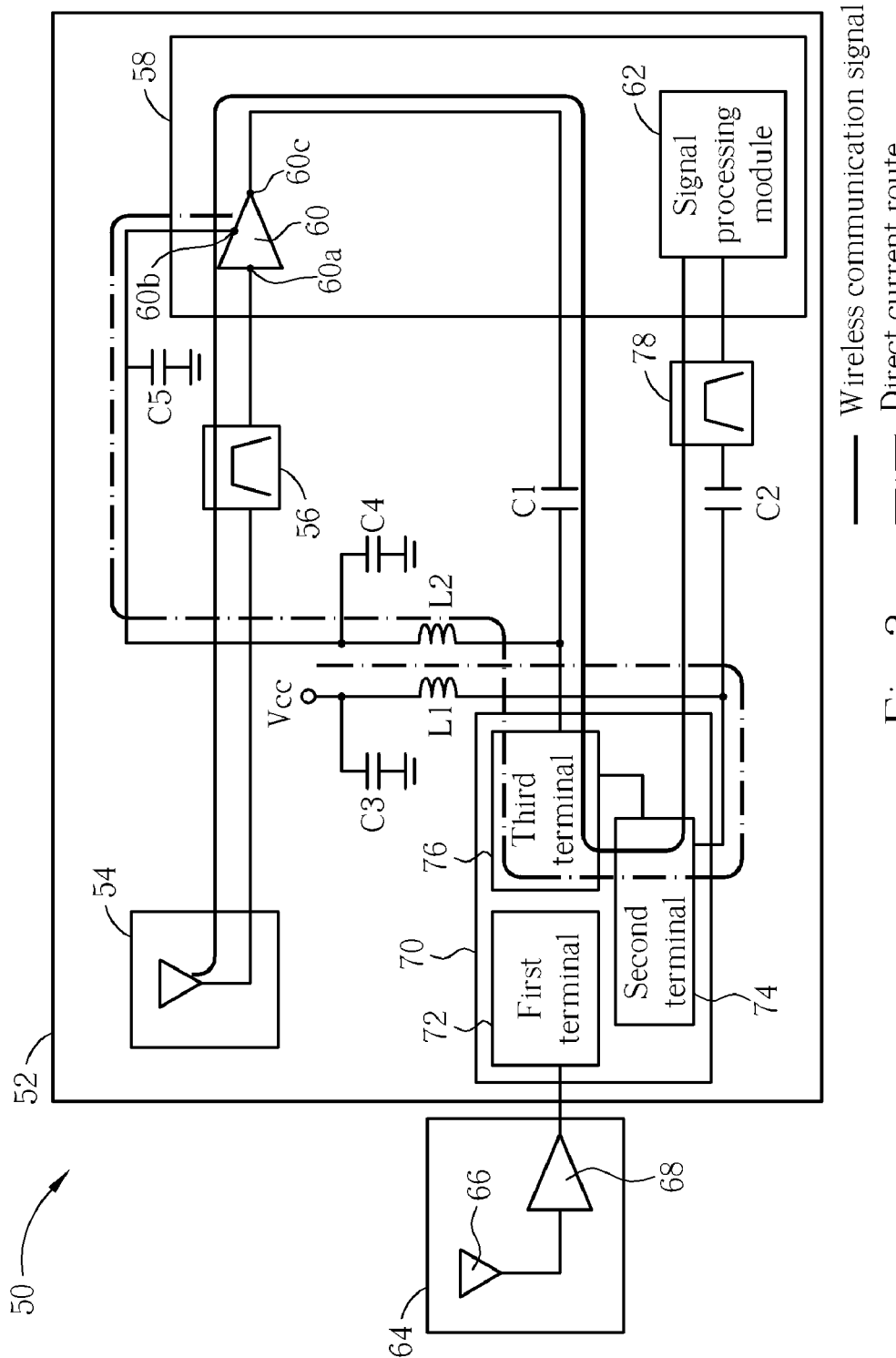
FIG. 3 illustrates a circuit diagram of a wireless communication device when an external antenna module is not connected to the wireless communication device according to the present invention.

Please refer to FIG. 3. FIG. 3 illustrates a circuit diagram of a wireless communication device 50 when an external antenna module 64 is not connected to the wireless communication device 50. The switch 70 is utilized for conducting the second terminal 74 and the third terminal 76 but not the first terminal 72 and the second terminal 74 when the first terminal 72 is not coupled to the external antenna module 64 so as to conduct a connection between the power source Vcc and the power input end 60b of the first low noise amplifier 60 and to conduct a connection between the internal antenna module 54 and the signal processing module 62.

As illustrated in FIG. 3, the wireless communication signals received by the internal antenna module 54 can be transmitted to the first SAW filter 56, and the first SAW filter 56 can be utilized for filtering the wireless communication signals received by the internal antenna module 54, and for transmitting the filtered signals to the signal input end 60a of the first low noise amplifier 60. The first low noise amplifier 60 will then amplify the wireless communication signals transmitted from the first SAW filter 56, the amplified signals will be transmitted to the second SAW filter 78 through the conduction of the second terminal 74 and the third terminal 76, the amplified signals will then be transmitted to the signal processing module 62 for processing through the second SAW filter 78. At this mode, a signal gain of the internal antenna module 54 is provided by the first low noise amplifier 60 of the GPS SiP 58. The direct current provided by the D/C power source is transmitted to the power input end 60b of the first low noise amplifier 60 through the first equivalent inductance L1, the conduction of the second terminal 74 and the third terminal 76, and the second equivalent inductance L2 so as to provide power required by the first low noise amplifier 60. The first capacitance C1 and the second capacitance C2 can be utilized for blocking the direct current provided by Vcc to prevent a coupling effect of the direct current and the wireless communication signals so as to block direct current from entering the transmission route of the wireless communication signals, and at the same time the wireless communication signals can pass through, thus the first capacitance C1 and the second capacitance C2 can be selected at the lowest resistance value within the GPS frequency band (1.57542 Ghz). Furthermore, the first capacitance C1 can also be utilized for the purpose of matching of the first low noise amplifier 60 output signal; and the first equivalent inductance L1 and the second equivalent inductance L2 can be utilized for blocking high frequency wireless communication signals to prevent the coupling effect of the direct current and the wireless communication signals so that frequency signal creates oscillation effect on different circuit through the direct current.

Figure 4:
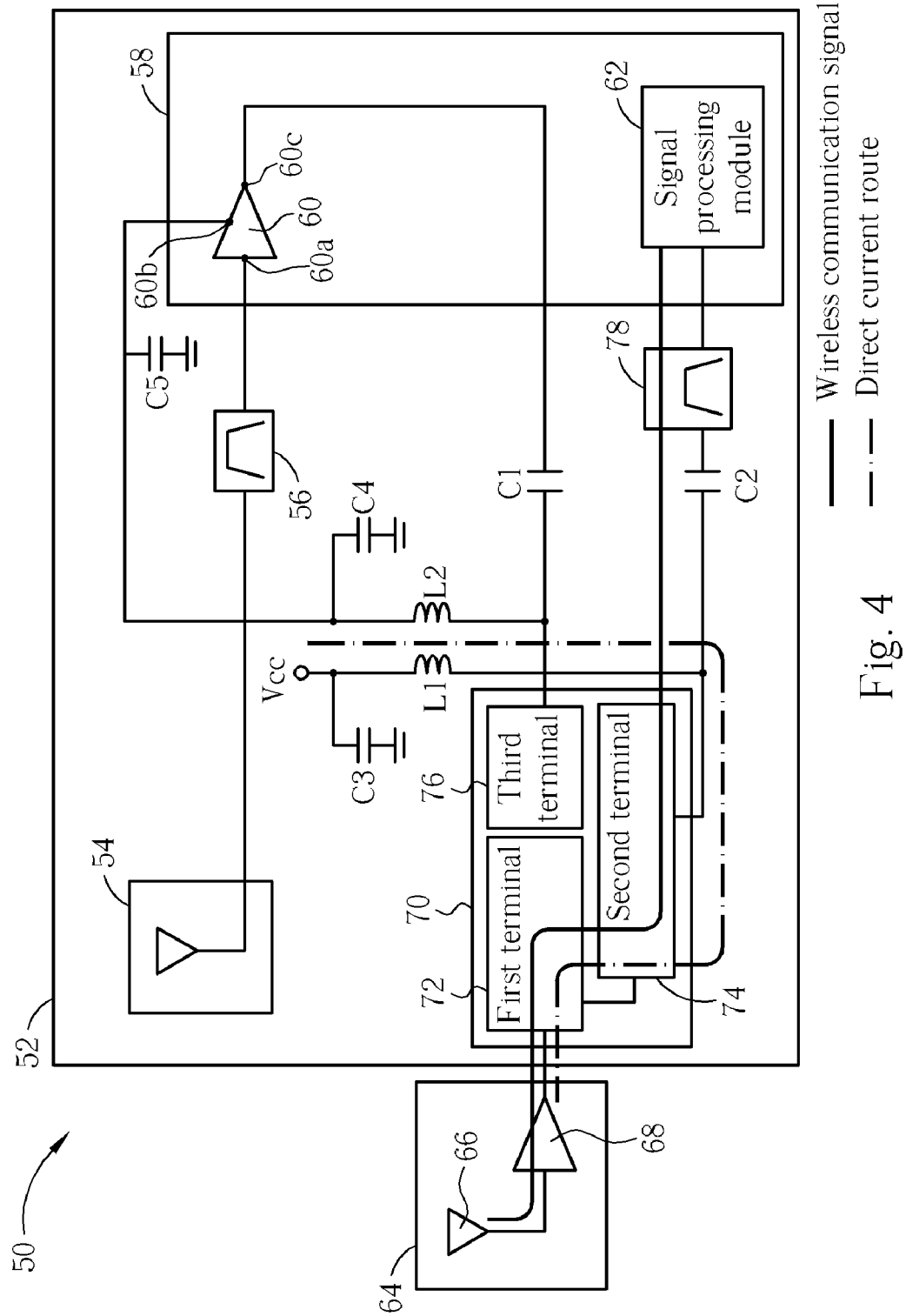
FIG. 4 illustrates a circuit diagram of a wireless communication device when an external antenna module is connected to the wireless communication device according to the present invention.

Please refer to FIG. 4. FIG. 4 illustrates a circuit diagram of a wireless communication device 50 when an external antenna module 64 is connected to the wireless communication device 50. The switch 70 is utilized for conducting the first terminal 72 and the second terminal 74, but not the second terminal 74 and the third terminal 76 when the first terminal 72 is coupled to the external antenna module 64 so as to conduct a connection between the power source Vcc and the second low noise amplifier 68 of the external antenna module 64, and to conduct a connection between the external antenna module 64 and the signal processing module 62. As illustrated in FIG. 4, wireless communication signals (such as GPS signals) received by the antenna unit 66 of the external antenna module 64 can be transmitted to the second low noise amplifier 68 to be amplified, and then through the conduction of the first terminal 72 and the second terminal 74, and the second capacitance, the amplified signals are then transmitted to the second SAW filter 78 to be filtered. The filtered signals are then transmitted to the signal processing module 62 to be processed. Thus in this mode, signal gain of the external antenna module 64 is provided by a stage second low noise amplifier 68 within the external antenna module 64. The direct current (power) provided by the D/C power source Vcc can be provided to the second low noise amplifier 68 through the first equivalent inductance L1, and the conduction of the first terminal 72 and the second terminal 74. The second capacitance C2 is utilized for blocking the direct current provided by the power source Vcc to prevent the coupling effect of the direct current and the wireless communication signals so as to block direct current from entering the transmission route of the wireless communication signals; the first equivalent inductance L1 and the second equivalent inductance L2 can be utilized for blocking high frequency wireless communication signals to prevent the coupling effect of the wireless communication signals and the direct current. Under the situation of the conduction of the second terminal 74 and the third terminal 76, the power source Vcc can stop providing power to the first low noise amplifier 60 of the GPS SiP 58 to achieve the effect of reducing power consumption.

In comparison to the conventional wireless communication device, the architecture of the wireless communication device of the present invention can include a low noise amplifier within a GPS SiP and connect to an external antenna module having a low noise amplifier to switch to the external antenna module or an internal antenna module, thus the suitable low noise amplifier can be selected to control amplified gain of the wireless communication signals received; also under the situation of the wireless communication device utilizing the external antenna module, a first low noise amplifier within the GPS SiP will not continuously receive power from the D/C power source, hence power consumption can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication device capable of switching to an external antenna module or an internal antenna module, the wireless communication device comprising:
 a housing;
 an internal antenna module installed within the housing for transmitting wireless communication signals;
 a direct current (D/C) power source for providing power;
 a signal processing module installed within the housing for processing the wireless communication signals;
 a first low noise amplifier coupled to the internal antenna module for amplifying the wireless communication signal received by the internal antenna module, the first low noise amplifier comprising:
  a signal input end coupled to the internal antenna module for receiving the wireless communication signals transmitted from the internal antenna module;
  a power input end for receiving direct current provided from the D/C power source; and
  a signal output end for outputting the amplified wireless communication signals;
 a switch comprising:
  a first terminal coupled to a second low noise amplifier of an external antenna module;
  a second terminal coupled to the signal processing module, the D/C power source, and the first terminal; and
  a third terminal coupled to the signal output end of the first low noise amplifier, the power input end, and the second terminal;
 a first equivalent inductance coupled to the D/C power source and the second terminal for blocking wireless communication signals;
 a second equivalent inductance coupled to the power input end of the first low noise amplifier and the third terminal for blocking wireless communication signals;
 a first capacitance coupled to the signal output end of the first low noise amplifier and the third terminal for blocking direct current; and
 a second capacitance coupled to the signal processing module and the second terminal for blocking direct current.

2. The wireless communication device of claim 1 further comprising a first surface acoustic wave filter coupled to the internal antenna module and the signal input end of the first low noise amplifier for filtering the wireless communication signals transmitted from the internal antenna module to the signal input end of the first low noise amplifier.

3. The wireless communication device of claim 1 further comprising a second surface acoustic wave filter coupled to the signal processing module and the second capacitance for filtering the wireless communication signals transmitted from the external antenna module to the signal processing module.

4. The wireless communication device of claim 1 wherein the signal processing module is a mixer for mixing wireless communication signals.

5. The wireless communication device of claim 1 wherein the signal processing module is a global positioning system (GPS) signal processing module.

6. A wireless communication device capable of switching to an external antenna module or an internal antenna module, the wireless communication device comprising:
 a housing;
 an internal antenna module installed within the housing for transmitting wireless communication signals;
 a direct current (D/C) power source for providing power;
 a signal processing module installed within the housing for processing the wireless communication signals;
 a first low noise amplifier coupled to the internal antenna module for amplifying the wireless communication signal received by the internal antenna module, the first low noise amplifier comprising:
  a signal input end coupled to the internal antenna module for receiving the wireless communication signals transmitted from the internal antenna module;
  a power input end for receiving direct current provided from the D/C power source; and
  a signal output end for outputting the amplified wireless communication signals;
 an external antenna module comprising:
  an antenna unit for transmitting wireless communication signals; and
  a second low noise amplifier for amplifying the wireless communication signals received by the antenna unit;
 a switch comprising:
  a first terminal coupled to the second low noise amplifier;
  a second terminal coupled to the signal processing module, the D/C power source, and the first terminal; and
  a third terminal coupled to the signal output end of the first low noise amplifier, the power input end, and the second terminal;
 a first equivalent inductance coupled to the D/C power source and the second terminal for blocking wireless communication signals;
 a second equivalent inductance coupled to the power input end of the first low noise amplifier and the third terminal for blocking wireless communication signals;
 a first capacitance coupled to the signal output end of the first low noise amplifier and the third terminal for blocking direct current; and
 a second capacitance coupled to the signal processing module and the second terminal for blocking direct current.

7. The wireless communication device of claim 6 further comprising a first surface acoustic wave filter coupled to the internal antenna module and the signal input end of the first low noise amplifier for filtering the wireless communication signals transmitted from the internal antenna module to the signal input end of the first low noise amplifier.

8. The wireless communication device of claim 6 comprising a second surface acoustic wave filter coupled to the signal processing module and the second capacitance for filtering the wireless communication signals transmitted from the external antenna module to the signal processing module.

9. The wireless communication device of claim 6 wherein the signal processing module is a mixer for mixing wireless communication signals.

10. The wireless communication device of claim 6 wherein the signal processing module is a global positioning system (GPS) signal processing module.

* * * * *